United States Patent
Sasaki et al.

[11] Patent Number: 5,667,440
[45] Date of Patent: Sep. 16, 1997

[54] BIDIRECTIONAL COMMUNICATION SYSTEM

[75] Inventors: Masafumi Sasaki; Takemi Yumoto; Kazuki Komatsu; Noriyuki Shiragami, all of Tokyo-to, Japan

[73] Assignee: Pioneer Electronic Corporation, Tokyo-to, Japan

[21] Appl. No.: 359,922

[22] Filed: Dec. 20, 1994

[30] Foreign Application Priority Data

Dec. 28, 1993 [JP] Japan .................................. 5-337579

[51] Int. Cl.⁶ .......................... H04L 12/00; H04N 7/173
[52] U.S. Cl. .............................. 463/29; 463/40; 348/13
[58] Field of Search ........................... 273/433, 434, 273/439, 148 B, 148 R, 313; 364/410; 348/13; 463/29, 42, 40

[56] References Cited

U.S. PATENT DOCUMENTS

| | | | |
|---|---|---|---|
| 3,997,718 | 12/1976 | Ricketts et al. | 348/13 |
| 4,572,509 | 2/1986 | Sitrick | 273/434 |
| 5,093,718 | 3/1992 | Hoasty et al. | 358/84 |
| 5,177,604 | 1/1993 | Martinez | 348/13 |
| 5,351,969 | 10/1994 | Smith, III et al. | 273/313 |
| 5,481,542 | 1/1996 | Logston et al. | 348/13 |

*Primary Examiner*—Jessica Harrison
*Assistant Examiner*—James Schaaf
*Attorney, Agent, or Firm*—Kane, Dalsimer, Sullivan, Kurucz, Levy, Eisele and Richard, LLP

[57] ABSTRACT

A bidirectional communication system includes a center unit and one or more terminal units connected to the center unit via a communication line. The center unit includes: program executing unit for executing one or more programs utilizing operation data in response to selection signals specifying a program to be executed and transmitting information associated with the programs to the terminal units via the communication line; control unit for controlling the program executing unit and the terminal units; and receiving unit for receiving the operation data from the terminal units and supplying the operation data to the program executing unit. The operation data being necessary for execution of the program. Each of the terminal units includes: transmitting unit for transmitting selection signal to the center unit via the communication line; display unit for displaying the associated information transmitted from the center unit; and operation unit for generating the operation data in accordance with user's instruction and transmitting the operation data at data output timings distributed to each terminal units.

14 Claims, 10 Drawing Sheets

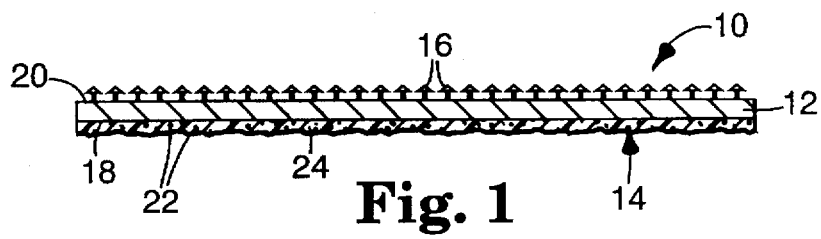
Fig. 1
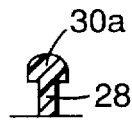 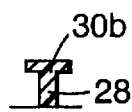 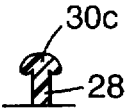 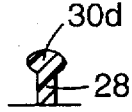
Fig. 2a   Fig. 2b   Fig. 2c   Fig. 2d
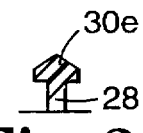 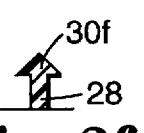 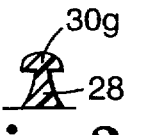 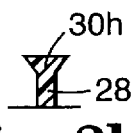
Fig. 2e   Fig. 2f   Fig. 2g   Fig. 2h
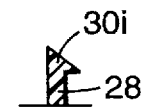   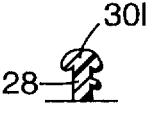
Fig. 2i   Fig. 2j   Fig. 2k   Fig. 2l
 
Fig. 2m   Fig. 2n
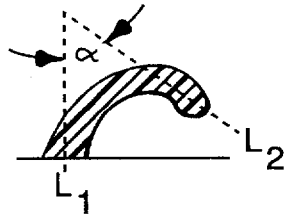 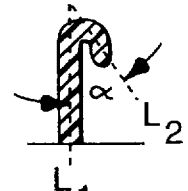
Fig. 3a   Fig. 3b
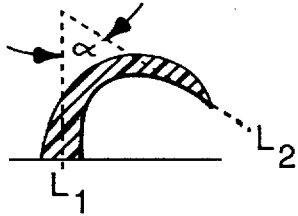 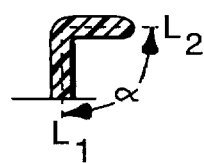
Fig. 3c   Fig. 3d

BIDIRECTIONAL COMMUNICATION SYSTEM

BACKGROUND OF THE INVENTION

1. Field of the Invention

This invention relates to a bidirectional communication system, and more particularly to a communication system suitably used for executing a program such as TV-game software between multiple terminal units in common.

2. Description of the Prior Art

Establishments such as hotels or the like are equipped, for providing information services, a communication network extending in specific areas such as CCTV (Closed Circuit Television) system. CCTV system is a closed-circuit television system utilizing wired communication network, and is provided with a center unit for managing whole system within an establishment such as a hotel and a plurality of terminal devices connected to the center via cables. Utilizing a CCTV system, a hotel or the like presents special voluntary programs as well as general TV broadcasting programs. In a guest room of the hotel, people sometimes enjoy playing a TV game. However, in a CCTV system, a center unit is not allowed to transmit information necessary for the TV game due to some technological reasons. Therefore, guest rooms of a hotel are provided with a game equipment, respectively, and guests connect the game equipment with a TV monitor of a terminal unit of the CCTV system to play the TV game. FIG. 1 is a block diagram illustrating an example of an amusement system using game equipments and CCTV system in combination. As illustrated, terminal devices $200_{-1}$ to $200_{-n}$ are installed in rooms $R_1$ to $R_n$, respectively. Converters 4 in the terminal devices $200_{-1}$ to $200_{-n}$ are connected to a CCTV communication line 300 in the hotel and are supplied with video programs such as a TV broadcasting program or voluntary program transmitted from center 100. To each of the terminal devices $200_{-1}$ to $200_{-n}$ are connected game equipments 3, and guests can connect the game equipment 3 to a TV monitor 5 via image input terminal of the converter 4 and enjoy the TV game with watching game images displayed on the monitor 5.

On the other hand, techniques utilizing a public communication line CATV (Cable-TV) system for enabling users of a terminal device to select and play one of a plurality of game programs stored in a center unit are disclosed in Japanese Patent Applications Laid-Open Nos. 63-99893 and 63-16739. Particularly, the system disclosed in the latter (Japanese Patent Applications Laid-Open No. 63-16739) enables a user to select a game program stored in a terminal device and the selected game program is read out and stored in the terminal device so that the user can enjoy the game. Namely, a registered user of the CATV line selects his/her favorite game program from a menu display on a TV monitor and requests the center to transmit the game program thus selected to his/her terminal device. In response, the center transmits the game program to the user's terminal device and the program is stored in a memory in the terminal device. As a result, the user can enjoy the game program as he/she plays it with general game equipment and game cartridge.

The above-mentioned technique utilizing a CCTV system does not have any alternative ways, other than providing game equipments in each guest rooms, respectively, to enable a user to play game programs from respective rooms. The center can send nothing more than a demonstration or attraction pictures relating to the game so that they are displayed on a monitor of the terminal device, and it is impossible to create a game playing circumstance in which the user can join in a game via a communication line. On the other hand, the above-mentioned program supplying manner using a CATV system is advantageous in that it requires low cost compared with the above method of providing game equipments in each rooms, respectively, and that abundant game programs stored in the center unit can be efficiently used. However, such a system has the following shortcomings. Firstly, in such a system, a terminal unit merely reads one of a plurality of game softwares stored in a center unit, and it is impossible that multiple terminal units have access to a unique game at the same time. Secondly, plural people in a guest room cannot play the same game together until the game program is completely read out from the center unit and stored in the terminal unit. Namely, in the above-mentioned system, it is impossible to enable plural people in the same room to play the same game together without reading and storing the game program in the terminal unit, although the center can provide game amusement as one of abundant information services including movie, TV broadcasting, etc. Thirdly, it is also impossible that plural people in different guest rooms play the same game together, e.g., compete against each other for their scores.

SUMMARY OF THE INVENTION

It is an object of the present invention to provide a bidirectional communication system utilizing a CCTV system or the like, by which plural people using plural terminal units can access to a single program commonly and simultaneously.

According to one aspect of the present invention, there is provided a bidirectional communication system including a center unit and one or more terminal units connected to the center unit via a communication line. The center unit includes: a program executing unit for executing one or more programs utilizing operation data in response to selection signals specifying a program to be executed and transmitting information associated with the programs to the terminal units via the communication line; a control unit for controlling the program executing unit and the terminal units; and a receiving unit for receiving the operation data from the terminal units and supplying the operation data to the program executing unit, the operation data being necessary for execution of the program. Each of the terminal units includes: a transmitting unit for transmitting a selection signal to the center unit via the communication line; a display unit for displaying the associated information transmitted from the center unit; and an operation unit for generating the operation data in accordance with user's instruction and transmitting the operation data at data output timings distributed to each terminal units.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

Preferred embodiments of the present invention will be described below with reference to the accompanying drawings.

Figure 2:
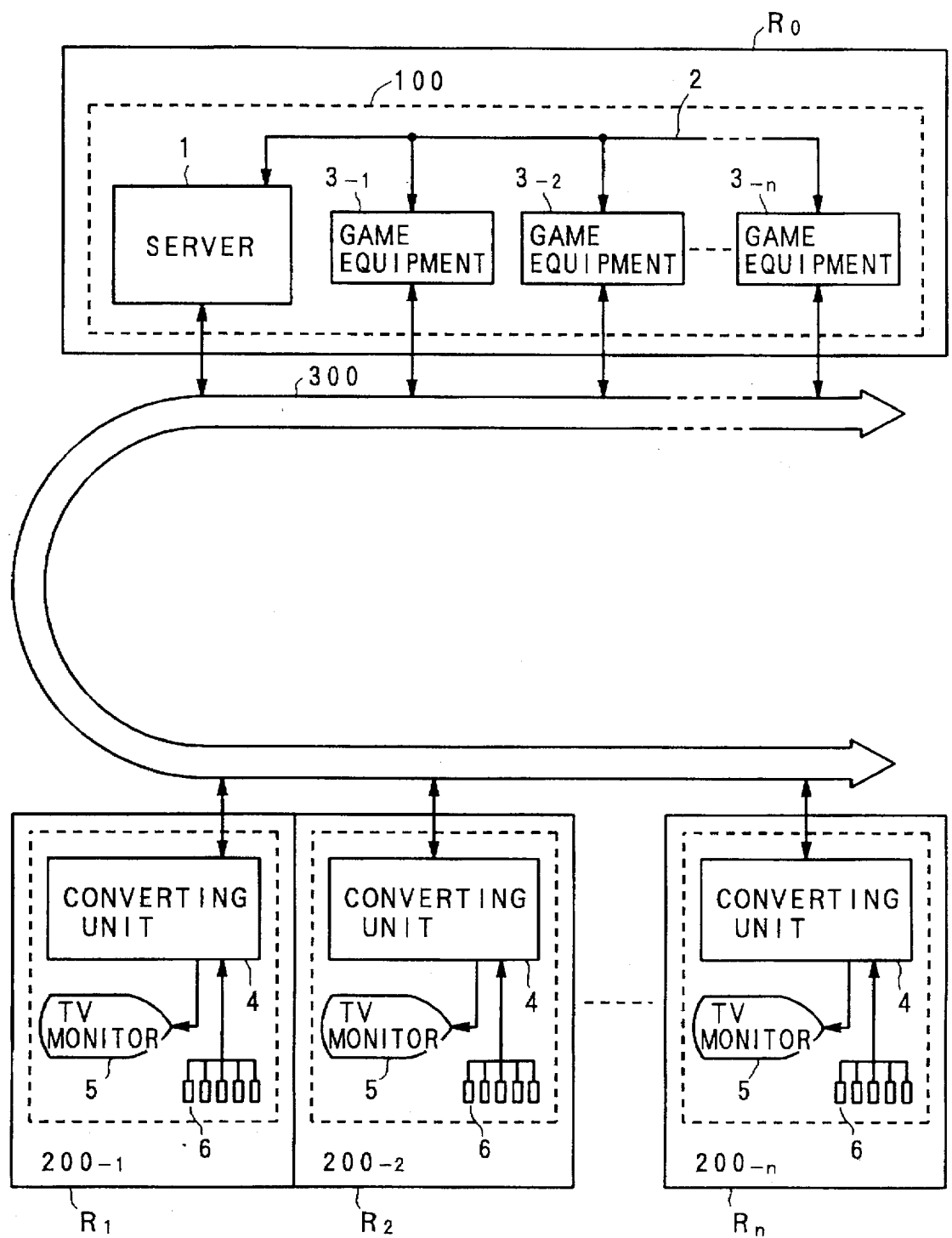
FIG. 2 is a block diagram illustrating bidirectional communication system according to the present invention.

1st Embodiment:

A first embodiment of the present invention will be described with reference to FIGS. 2 to 5. FIG. 2 is a block diagram illustrating a bidirectional communication system according to the present invention. As illustrated in FIG. 2, the bidirectional communication system roughly includes a center unit 100 provided in a central control room $R_o$ in a certain establishment such as a hotel, terminal devices $200_{-1}$ to $200_{-n}$ provided in each of rooms $R_1$ to $R_n$ and operable by plural people, respectively, and a CCTV communication line 300 installed in the establishment to connect the center unit 100 and the terminal devices $200_{-1}$ to $200_{-n}$. Hereinafter, an arbitrary one of the terminal devices $200_{-1}$ to $200_{-n}$ is simply referred to as "terminal device 200". The center unit 100 includes a server 1 for controlling whole devices and equipments within the bidirectional communication system, a plurality of game equipments $3_{-1}$ to $3_{-n}$ for executing different game programs and outputting game image signals modulated into different frequencies, respectively, and a local bus 2 for connecting them. The server 1 and the game equipments $3_{-1}$ to $3_{-n}$ are connected to the CCTV communication line 300 to mutually transmit and receive digital data, video signal, program operation data and so on. "Program operation data" is data generated according to manipulations of joy-pads, the details of which will be described later. Hereinafter, an arbitrary one of the game equipments $3_{-1}$ to $3_{-n}$ is simply referred to as "game equipment 3". The server 1 includes a CPU (Central Processing Unit) for carrying out whole processing including judgements, retrievals and counting, a play control unit for controlling the game equipments $3_{-1}$ to $3_{-n}$, a CCTV video signal transmitter for transmitting video signal of general TV broadcasting or voluntary programs as essential function of CCTV system, and a digital data communication modem for performing bidirectional data communication with the respective terminal devices $200_{-1}$ to $200_{-n}$ (these components are not shown).

Figure 3:
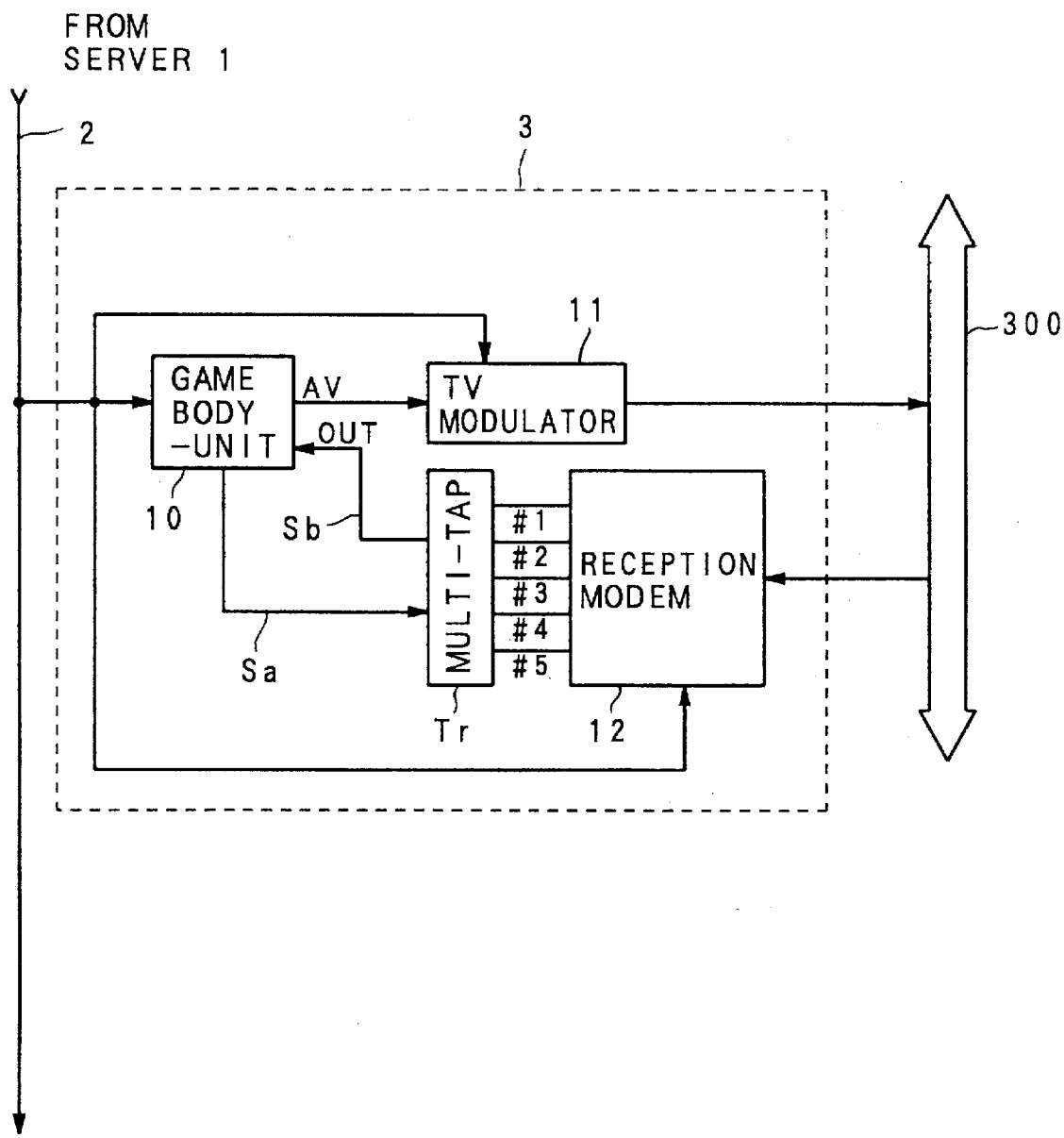
FIG. 3 is a block diagram illustrating a construction of a game equipment shown in FIG. 3.

FIG. 3 is a block diagram illustrating a construction of a game equipment 3 shown in FIG. 3. As illustrated, the game equipment 3 includes a game body-unit 10, a TV modulator 11, a reception modem 12 and a multi-tap Tr. The game body-unit 10 stores a game program and executes it, and the TV modulator 11 modulates a game image signal from the game body-unit 10 and outputs it. The reception modem 12 receives program operation data transmitted from the terminal devices via the CCTV communication line 300 and demodulates it into original program operation data. The multi-tap $T_r$ converts multiple program operation data into data recognizable by the game body-unit 10 and outputs them in a time-divided manner. The game body-unit 10, the TV modulator 11, the reception modem 12 are connected to the server 1 via the local bus 2 so that the server 1 can set transmission-reception channels for transmitting and receiving game video signal and program operation data.

Each terminal device 200 includes, as illustrated in FIG. 2, a converting unit 4, a TV monitor 5 and joy-pads 6. The converting unit 4 controls the terminal device 200 as a whole to perform digital data communication with the center unit 100 via the CCTV communication line 300. Further, the converting unit 4 receives video signals relating to various programs to output them on the monitor 5, and receives program operation data from the joy-pad 6 and transmits it to the center unit 100 via the CCTV communication line 300. The TV monitor 5 displays instructions issued by the center unit 100 or information that appears in procedure of game program. The joy-pad 6 is manipulated by user during playing game, and outputs program operation data according to the user's handling.

Figure 4:
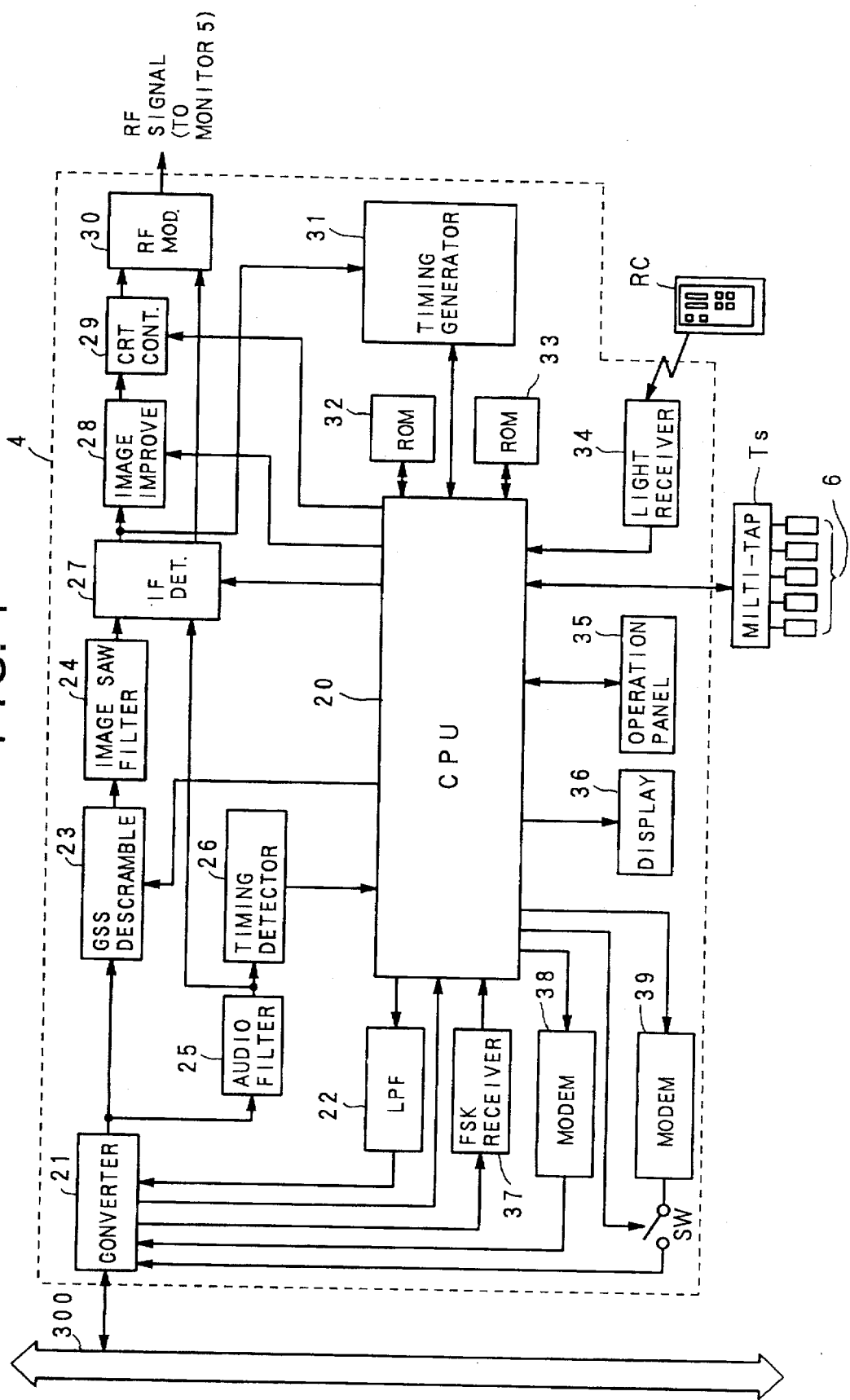
FIG. 4 is a block diagram illustrating a converting unit shown in FIG. 2.

FIG. 4 is a block diagram illustrating a converting unit shown in FIG. 2. As illustrated, the converting unit 4 includes a CPU 20 which controls whole parts of the converting unit 4. In the converting unit 4, a converter 21 selects desired channel, converts frequency of the modulated video signal into an intermediate frequency (e.g., 58.75 MHz) to produce and output IF signal. A LPF 22 supplies a DC component for controlling local tuner and local oscillator to the converter 21 so as to define a reception frequency of thereof. A GSS descrambler 23 releases scrambling of the CCTV signal according to GSS system at if signal stage. An image SAW filter 24 obtains video IF signal from the descrambled IF signal, and an audio filter 25 obtains audio IF signal from the IF signal output from the converter 21. A timing detector 26 detects timing signal for releasing GSS type scrambling from the audio IF signal. An IF detector 27 receives the video IF signal and the audio IF signal, and detects base-band video signal and audio signal. An image improving unit 28 eliminates noise component from the video signal. A CRT controller 29 superimposes character information, read out from ROMs 32 and 33 and supplied via the CPU 20, onto the video signal. An RF modulator 30 modulates the video and audio signals and outputs RF signal to be supplied to the monitor 5. A timing generator 31 generates a pulse signal serving as distribution information of game programs from the detected video signal. The ROMs 32 and 33 store image data of a menu or description to be processed by the CRT controller 29. The light receiver 34 receives a signal transmitted from an external remote-controller RC, and an operation panel 35 is an operation box manipulated by user for directly operating the converting unit 4. A display 36 performs simple displays such as a display of channel number under reception. An FSK receiver 37 receives digital data of down direction (i.e., from center unit to terminal devices) according to FSK modulation (e.g., frequency band of 75 MHz) and demodulates it. A modem 38 modulates digital data of up direction (i.e., from terminal devices to center unit) output from the CPU 20 by FSK modulation and outputs it at a predetermined frequency (e.g., 24 MHz). A modem 39 modulates program operation data which is generated according to the user's handling of the joy-pad 6 by FSK modulation (e.g., 50-70 MHz) and outputs modulated data. A switch SW is controlled by the CPU 20 to supply data modulated by the modem 39 to the CCTV communication line 300. When multiple joy-pads 6 are operated simultaneously, the multi-tap Tr carries out time-division multiplexing of multiple program operation data from the joy-pads 6 and supplies program operation data thus time-divided to the CPU 20.

Figure 5:
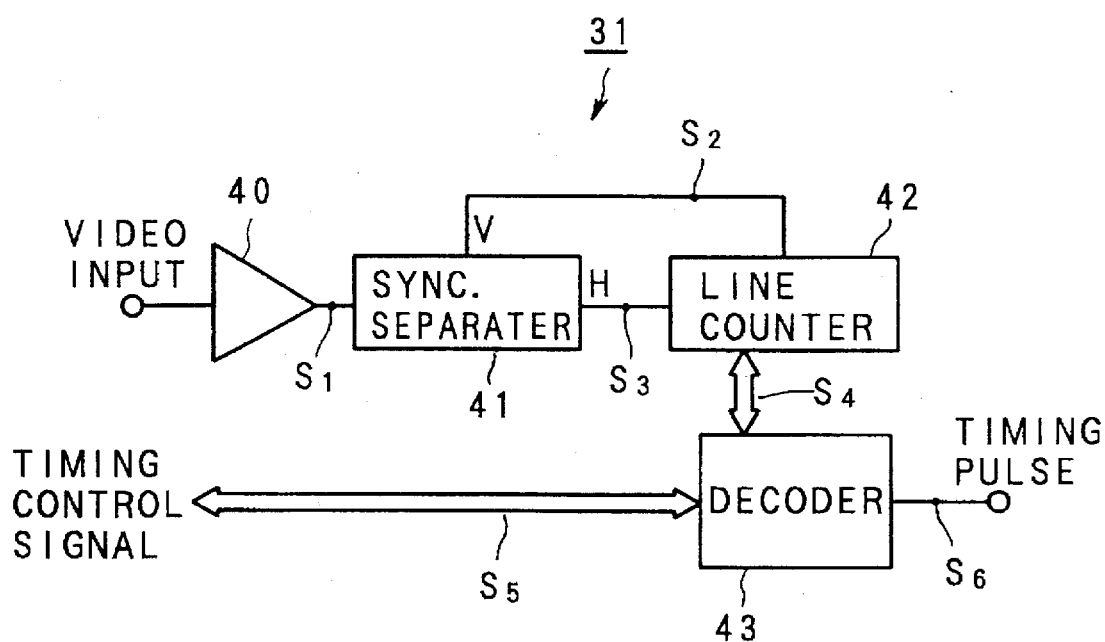
FIG. 5 is a block diagram illustrating a construction of a timing generator shown in FIG. 2.

FIG. 5 is a block diagram illustrating a construction of a timing generator shown in FIG. 2. As illustrated, the timing generator 31 includes a buffer 40, a sync-separator 41, a line counter 42 and a decoder 43. The buffer 40 receives video signal and outputs it with low impedance. The sync-separator 41 separates, from the video signal, vertical synchronizing signal V and horizontal synchronizing signal H, and outputs them. The line counter 42 counts the horizontal synchronizing signals H and is reset at the timing of blanking periods of the vertical synchronizing signals V. The decoder 43 receives address information from the CPU 20 and outputs a timing pulse when the count value supplied from the line counter 42 is coincident with address information.

Figure 6A:
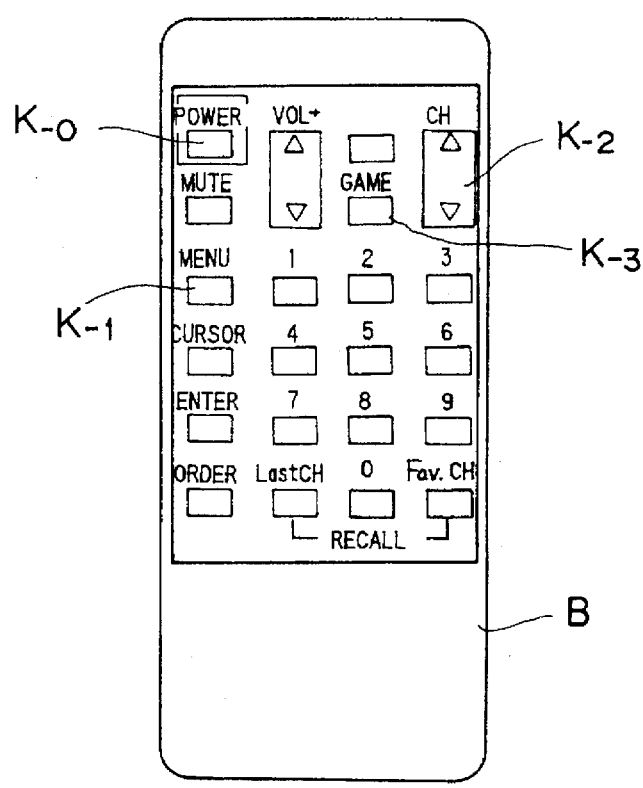
FIG. 6A shows an appearance of remote-controller shown in FIG. 4.
Figure 6B:
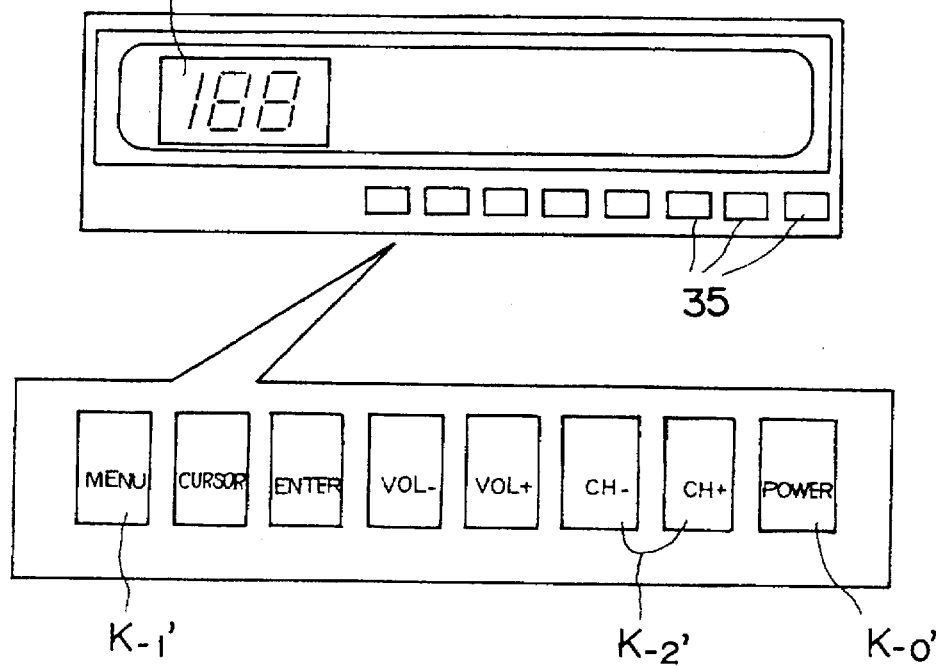
FIG. 6B shows an appearance of operation panel shown in FIG. 4.

FIG. 6A illustrates an appearance of remote-controller RC shown in FIG. 4, and FIG. 6B illustrates an appearance of operation panel 35 shown in FIG. 4. A user can select a TV-broadcasting program, voluntary program or game program relating to CCTV system using the remote-controller RC. For example, manipulation of the power switch $K_0$ switches D.C. supply of the terminal device. Manipulation of the menu-key $K_{-1}$ makes the display 36 represent a menu of TV-broadcasting program, voluntary program or game program, and user makes selection from them. When a TV-broadcasting program or voluntary program is selected by pressing the menu-key $K_{-1}$, user can select his/her favorite channel using the channel-key $K_{-2}$. Game program can be selected using the game-selection key $K_{-3}$. Some of these operation keys are also provided on the operation panel 35. The display 36 represents information relating to the selection, including channels thus selected.

The CCTV communication line 300 is constituted by coaxial cables. Via the CCTV communication line 300, signals are transmitted between the server 1, the game equipments $3_{-1}$ to $3_{-n}$ provided in the center unit 10 and terminal devices $200_{-1}$ to $200_{-n}$. Specifically, the server 1 in the center unit 100 transmits control data by a polling method, as a down direction signal, from the center unit 100 to the terminal devices $200_{-1}$ to $200_{-n}$. For example, when controlling the terminal device $200_{-1}$ in the room $R_1$, the server 1 modulates command data designating address of the terminal device $200_{-1}$ by FSK modulation using digital data communication modem, and transmits it via the CCTV communication line 300 as demodulated signal of a predetermined frequency (e.g., 75 MHz). The CCTV video signal transmitter in the center unit 100 transmits carrier of VHF/UHF frequency for general TV-broadcasting program and voluntary program. The game equipment 3 in the center unit 100 transmits carrier for game image signal. When, the terminal device $200_{-2}$ provided in the room $R_2$ starts execution of game program stored in the game equipment $3_{-1}$, the server 1 searches for an unoccupied (i.e., not busy) channel in VHF frequency, and sends a command for designating the channel to the game equipment $3_{-1}$ and the terminal device $200_{31\ 2}$. The game equipment $3_{-1}$ transmits a game image signal using the carrier of the unoccupied frequency (e.g., near 150 MHz) via the CCTV communication line 300. The terminal device $200_{-2}$ is tuned to the frequency according to the command and receives the carrier of the game video signal.

On the other hand, as an up direction signal from the terminal device 200 to the center unit 100, communication control signal and program operation data are transmitted. When the terminal device $200_{-1}$ in the room $R_1$ sends request data to the center unit 100 as communication control signal, the terminal device $200_{-1}$ modulates the request data for selecting a game program by digital modulation (e.g., FSK modulation), and transmits it via the CCTV communication line 300 using a carrier frequency which is not conflict with other carrier frequencies (e.g., 24 MHz) used for transmitting other program operation data of other terminal devices 200. In addition, the terminal device $200_{-1}$ sends program operation data generated in response to the user's handling of the joy-pad 6 by a predetermined carrier (e.g., FSK-modulated: 50–70 MHz).

Next, a principle of operation according to the first embodiment will be described. In this embodiment, the terminal devices $200_{-1}$ to $200_{-n}$ in the rooms $R_{-1}$ to $R_{-n}$ can access to the game equipments $3_{-1}$ to $3_{-n}$ in the center unit 100. In other words, the game equipments $3_{-1}$ to $3_{-n}$ are commonly usable by the terminal devices $200_{-1}$ to $200_{-n}$. Therefore, it is required to monitor conditions of the game equipments $3_{-1}$ to $3_{-n}$ executing game programs and to grasp which game is played by how many players of which terminal device. This control is executed by the server 1 according to a polling communication system. The "Polling" communication system is as follows. Each of the terminal devices $200_{-1}$ to $200_{-n}$ are applied, in advance, terminal addresses of their own, and the center unit 100 transmits a command by designating a terminal address corresponding to a terminal devices (e.g., the terminal device $200_{-1}$). The center unit 100 waits for and receives counter response from the terminal device $200_{-1}$, and then sends A command to an other terminal device (e.g., the terminal device $200_{-2}$) by designating next terminal address. In this manner, the center unit 100 communicates with other terminal devices by varying the address. According to this polling communication system, bidirectional communication can be achieved by using, as the counter response, up-direction signal from the terminal devices 200 to the center unit 100. Commands issued by the server 1 includes number of terminal device to which message is sent, terminal address and command data field, and the server 1 can force the terminal device 200 to tune to an arbitrary channel using this command. As a concrete example, it is assumed that the center unit 100 communicates with the terminal device $200_{-1}$ in the room $R_{-1}$ by digital communication. In this case, the server 1 in the center unit 100 designates terminal address (e.g., "01") allocated to the terminal device $200_{-1}$ and sends command via the CCTV communication line 300. The CPU 20 (see. FIG. 4) provided in the converting unit 4 of the terminal device $200_{-1}$ constantly monitors command via the FSK receiver 37. If the terminal address "01" peculiar to the terminal device $200_{-1}$ is detected, the CPU 20 reads the command and interprets its contents. If it is command for confirming operation condition of terminal device $200_{-1}$, the CPU 20 transmits data relating to this command and held herein to the center unit 100 via the modem 38, as up direction signal. Alternatively, if it is command for designating channel, the terminal device 200 tunes reception channel of its converter 21 to the channel designated by command the data.

There are some problems to be solved when a single game equipment is used simultaneously and commonly by multiple terminal devices. The first problem is that it is required to avoid conflict, in transmission channels, of video signal of one game equipment with video signals of other game equipments. In order to solve this problem, it is necessary for the server 1 to find an unoccupied (non-busy) channel and to use the unoccupied channel as a transmission channel between the game equipment 3 and the terminal device 200. Here, as an example, it is assumed that terminal device $200_{-n}$ has been communicating with the game equipment $3_{-2}$ and terminal devices $200_{-1}$ and $200_{-2}$ additionally start communication with game equipment $3_{-1}$ simultaneously and commonly. In this case, the server 1 firstly detects a channel being used by the game equipment $3_{-2}$, by referring to its control information, and selects and decides an unoccupied channel other than the channel being used by the game equipment $3_{-2}$. Then, the server 1 sets the transmission frequency of the TV modulator 11 (see. FIG. 3) of the game equipment $3_{-1}$ to the unoccupied channel thus decided. Simultaneously, the server 1 sends command to the terminal devices $200_{-1}$ and $200_{-2}$, via the CCTV communication line 300, instructing to tune their reception channels to the unoccupied channel. In this way, conflict of channels for transmitting video signal between different game equipments is avoided.

Next, second problem will be examined. The second problem is that it is required to transmit program operation data of one terminal devices to game equipment without conflict, in transmission frequencies, with program operation data of other game equipments. In order to solve this problem, similarly to the case of the first problem, the server 1 sets transmission channel of the game equipment 3 and the terminal device 200 to an unoccupied channel. For example, it is assumed that terminal device $200_{-1}$ has been transmitting program operation data to game equipment $3_{-1}$ using transmission channel of frequency 50 MHz and now terminal device $200_{-2}$ starts transmitting program operation data to the game equipment $3_{-2}$. In this circumstance, the server 1 checks control information relating to the game equipment $3_{-1}$ and finds out an unoccupied channel whose frequency (e.g., 52 MHz) is not conflict with frequency used for transmitting program operation data from the terminal device $200_{-1}$ (i.e., 50 MHz). Then, the server 1 sets reception frequency of the reception modem 12 (see. FIG. 3) in the game equipment $3_{-2}$ to the unoccupied channel using the local bus 2. In addition, the server 1 sends command to designate a terminal address peculiar to the terminal device $200_{-2}$ (e.g., "02") via the CCTV communication line 300 so as to access to the terminal device $200_{-2}$ selecting the game equipment $3_{-2}$. In the terminal device $200_{-2}$, the CPU 20 tunes transmission frequency of the modem 39 (see. FIG. 4) which modulates program operation data to the channel, i.e., 52 MHz. In this way, conflict of channels for transmitting program operation data of different game equipments is avoided.

Next, third problem, which is of most significance, will be examined. The third problem resides in how to separate and process multiple program operation data which are generated almost simultaneously with no interrelation in time with each other, when multiple terminal devices use the same game equipment at the same time. For example, it is assumed that the server 1 designated an unoccupied channel for transmission and reception of video signal and program operation data between center unit 100 and terminal devices $200_{-1}$ to $200_{-2}$. In this case, if transmission timings of multiple program operation data from two terminal devices $200_{-1}$ and $200_{-2}$ are not ruled (e.g., asynchronous with each other), the server 1 cannot discriminate between program operation data from the terminal device $200_{-1}$ and terminal device $200_{-2}$. In this regard, according to this embodiment, the server 1 distributes transmission timings of program operation data from multiple terminal devices ($200_{-1}$ and $200_{-2}$, in this example) using synchronizing signal of video signal transmitted from the game equipment selected, so that the data transmission timings of the multiple terminal devices are distinguished from each other in time. This can solve the third problem.

Figure 7:
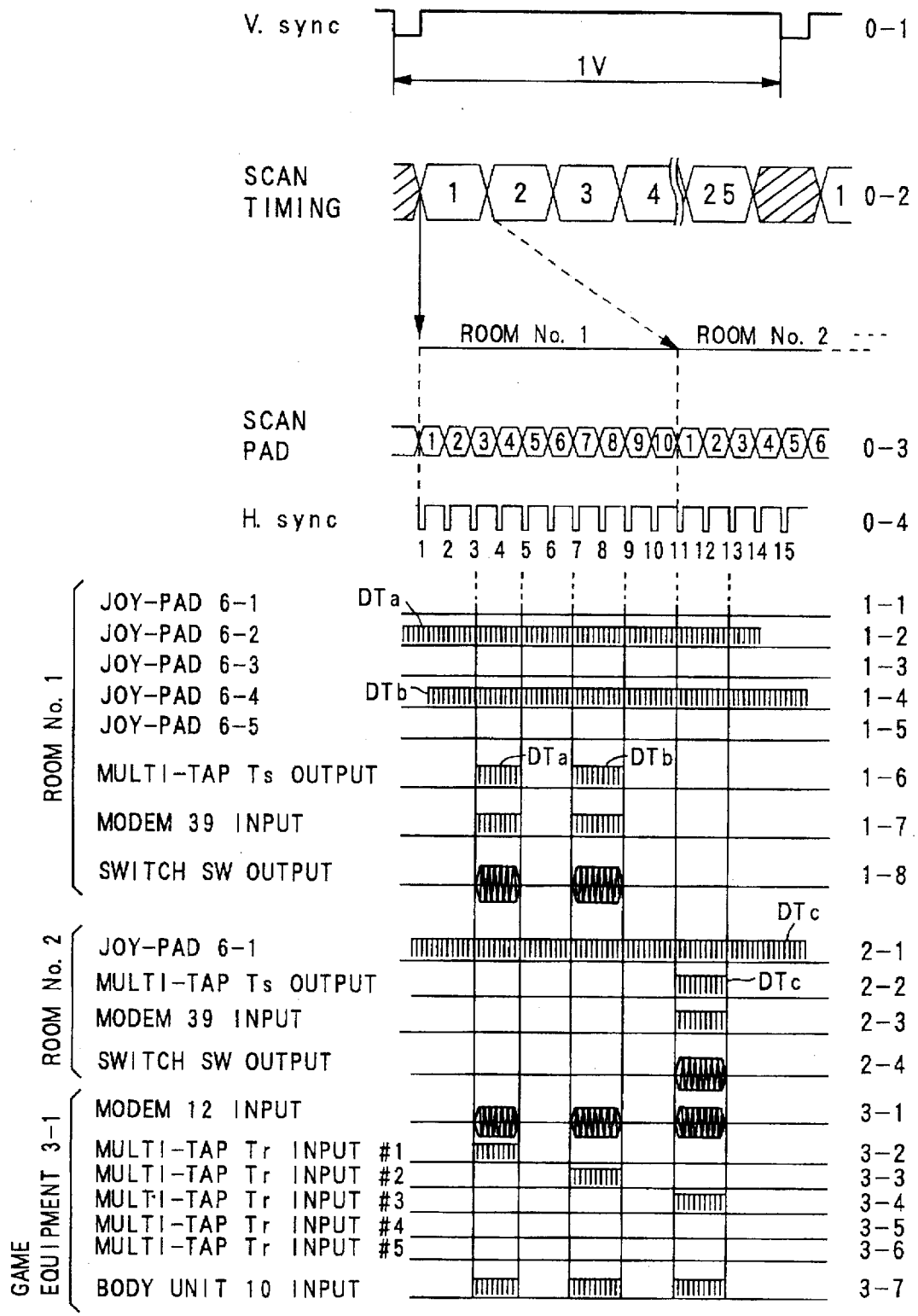
FIG. 7 is a timing chart illustrating distribution manner of data transmission timings from terminal devices to center unit.

Next, an example of distribution of program operation data output timing will be described With reference to FIGS. 5, 7 and 8. In this example, it is assumed that a plurality of players A, B, D and E play game of game equipment $3_{-1}$ using joy-pads 6 of terminal device $200_{-1}$ in a room NO. 1, and that another player C plays the same game using terminal device $200_{-2}$ in a room No. 2. Namely, five players in total commonly play the same game from two terminal devices at the same time. In a case where plural players commonly play same game, the server 1 decides number of horizontal synchronizing signals (i.e., time period) required for transmitting respective program operation data. Namely, the server 1 distributes data output timings for each terminal device to blocks of successive horizontal synchronizing periods (FIG. 7:0–4) within a vertical synchronizing period (FIG. 7: 0–1). For example, if five joy-pads 6 are connectable to a multi-tap Ts, 10 horizontal synchronizing periods (hereinafter simply referred to "H") are distributed to as a single joy-pad 6, because one joy-pad 6 requires data output periods of 2H due to motions for moving characters of game upward, downward, right or left, or for shooting some targets or the like in the game. As a result, a block having a period of 10H is distributed to each terminal devices 200. Specifically, as shown in FIG. 7: 0–2, the server 1 distributes initial 10H from the rising edge of a vertical synchronizing signal to the terminal device $200_{-1}$ in the room No. 1 by applying distribution number "01" to the terminal device $200_{-1}$. Similarly, the server 1 applies distribution number "11" to the terminal device $200_{-2}$ so as to distribute next 10H period from 11th-H (i.e., 11th-H to 20th-H) to the room No. 2, and applies distribution number "21" to the terminal device $200_{-3}$ so as to distribute next 10H period from 21th-H (i.e., 21th-H to 30th-H) to the room No. 3. The number of rooms (or joy-pads) to which data output periods for outputting program operation data are distributed is limited by the number of horizontal synchronizing signals or counting number of the line counter 42 provided in the timing generator 31. Since 10H period from the initial horizontal synchronizing period (i.e., 1st-H to 10th-H) are distributed to the terminal device $200_{-1}$ in the room No. 1 (see. FIG. 7:0–3), output timings of program operation data from each joy-pads 6 are specified from an offset (2H per one joy-pad) and the distribution number applied to the terminal device by the server 1. Accordingly, assuming that five joy-pads 6 connected to the multi-tap Ts are referred to as $6_{-1}$ to $6_{-5}$, respectively, "3rd-H and 4th-H" are distributed to the joy-pad $6_{-2}$ used by player A and "7th-H and 8th-H" are distributed to the joy-pad $6_{-4}$ used by the player B. While a player keeps on pushing an operation button, the joy-pad 6 repeatedly outputs code data indicating contents of the pushed operation button. For example, if a player pushes a button labeled "RIGHT" to move a character of the game in the right direction on the TV monitor 5, the joy-pad 6 repeatedly outputs operation data indicating that the "RIGHT" button is pushed. Normally, it is impossible for a human being to push an operation button of joy-pad for time period shorter than 100 ms. In this regard, an operation button is continuously pushed at least for several vertical synchronizing periods because vertical synchronizing period of NTSC television system is 16.7 ms. Accordingly, when the player A pushes the operation button of the joy-pad $6_{-2}$, the joy-pad $6_{-2}$ outputs corresponding operation data $DT_a$ indicating "RIGHT" direction (see. FIG. 7:1–2). Similarly, when the player B pushes the operation button of the joy-pad $6_{-4}$, the joy-pad $6_{-4}$ outputs corresponding operation data $DT_b$ indicating "LEFT" direction (see. FIG. 7:1–4). Since operation buttons of other joy-pads $6_{-1}$ (player D) and $6_{-3}$ (player E) are not pushed at that time, no data is output. These code data $DT_a$ and $DT_b$ are divided in time by the multi-tap Ts on the basis of the timing pulses generated by the timing generator 31, and then supplied to the CPU 20.

Figure 8:
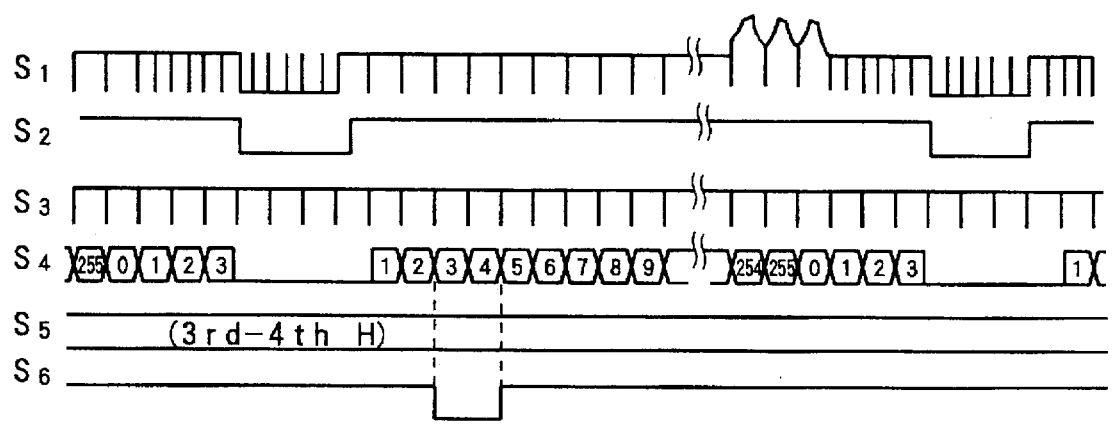
FIG. 8 is a timing chart illustrating a process of generating a timing pulse for outputting data from joy-pad.

FIG. 8 is a timing chart illustrating a process of generating a timing pulse for outputting data for the joy-pad $6_{-2}$. Output timing of program operation data is determined on the basis of the synchronizing signal in the game video signal. Firstly, game image signal received by the converter 21 tuned to the appropriate frequency is input to the timing generator 31 via the IF detector 27. The game image signal is input to the buffer 40 in the timing generator 31. The sync-separator 41 separates synchronizing the signal from the game video signal to obtain vertical synchronizing signal $S_2$ and horizontal synchronizing signal $S_3$. The line counter 42 using the vertical synchronizing signal $S_2$ as a reset signal starts counting the horizontal synchronizing signals $S_3$ from the rising edge of the vertical synchronizing signal $S_2$ (see. FIG. 8:$S_4$). The line counter 42 may be a general counter whose maximum count number approximately equals to the number of horizontal synchronizing periods within one field period of television system. For example, an 8-bit counter may be used as the line counter 42 because it can count up to 256 which is close to a number (262–263) of horizontal synchronizing periods within one-field NTSC television signal. The output of the line counter 42 is supplied to the decoder 43. The decoder 43 is constituted of a so-called coincidence circuit, and outputs timing pulse (see. FIG. 8:$S_6$) falling to low-level when parallel data $S_5$ from the CPU 20 is coincident with the parallel data from the line counter 42. In this case, since the data output period of the joy-pad $6_{-2}$ is "3rd-H to 4th-H", the CPU 20 recognizes the numbers "3–4" from the command received from the server 1 and supplies code signal $S_5$ indicating "3–4" to the decoder 43 as parallel data. By this, a timing pulse (see. $S_6$) is obtained at the timing of 3rd-H to 4th-H which is designated by the number supplied from the server 1.

In the terminal device $200_{-1}$ to which distribution number "01" is applied, the timing generator 31 supplies timing pulse to the CPU 20 from the time of 1st-H. The CPU 20 supplies data output timing signal to the multi-tap Ts, and the multi-tap Ts supplies program operation data obtained from the joy-pads 6 to the CPU 20 in a time-divided manner according to the data output timing signal from the CPU 20 (see. FIG. 7:1–6). Then, the CPU 20 successively transmits program operation data supplied from the multi-tap Ts to the modem 39 (see. FIG. 7:1–7). The modem 39 digitally modulates the operation data (e.g., by FSK modulation) and transmits it by a carrier of a frequency (e.g., 50–70 MHz) designated by the server 1 and set by the CPU 20. The switch SW supplies digitally-modulated data from the modem 39 to the CCTV communication line 300 at the timings according to the timing pulse supplied from the CPU 20 (see. FIG. 7:1–8). By these operations, program operation data from each joy-pads 6 is output if one of the joy-pad 6 connected is manipulated during horizontal synchronizing periods corresponding to the joy-pad 6. Therefore, multiple program operation data generated by multiple joy-pads 6 can be transmitted to the same terminal device 200 without conflict in time with each other. On the other hand, the server 1 supplies distribution number "11" to the terminal device $200_{-2}$ which joins in the same game to distribute 10H period from 11th-H measured from the rising edge of the vertical synchronizing signal as data output period for the program operation data of the terminal device $200_{-2}$. The joy-pad $6_{-1}$ in the terminal device $200_{-2}$ used by the player C generates operation data $DT_c$ (FIG. 7:2–1), and the data $DT_c$ is output to the multi-tap Ts during data output timing (i.e., 11th-H to 12th-H, see FIG. 7:2–2) distributed to the joy-pad $6_{-1}$ in the terminal device $200_{-2}$. The modem 39 receives the data $DT_c$ (FIG. 7:2–3), digitally modulates it using a frequency designated by the terminal device $200_{-1}$, and outputs it to the switch SW (FIG. 7:2–4). The switch SW outputs FSK-modulated signal which includes the data $DT_c$ at data output period distributed to the terminal device $200_{-1}$, i.e., periods 11th-H to 12th-H (FIG. 7:2–4).

According to the above operation, the reception modem 12 in the game equipment 3 receives, via the CCTV communication line 300, a signal to which data $DT_a$, $DT_b$ and $DT_c$ are multiplexed in a time-division manner (FIG. 7:3–1). The reception modem 12 demodulates this data and outputs them to five joy-pad signal lines #1 to #5 (FIG. 7:3–2 to 3–6). Data supplied to these joy-pad signal lines #1 to #5 are output in an order from data having small data output period number to large ones. Therefore, data $DT_a$ having data output period numbers "3–4" is output via the signal line #1, data $DT_b$ having distribution numbers "7–8" is output via the signal line #2, the signal line #3. The signal lines #4 and #5 correspond to the joy-pads $6_{-1}$ and $6_{-2}$, however, no data is output to them because these joy-pads are not operated at this time. The multi-tap Tr transmits these data to the game body-unit 10. The multi-tap Tr may transmits these data at the same timings as they are supplied, and alternatively may successively transmits them in synchronous with scan timing signal (e.g., vertical synchronizing signal of video signal) supplied from the game body-unit 10. Further, all data from five joy-pads may be directly transmitted by serial transmission from the reception modem 12, alternative to using multi-tap Tr. In the game body-unit 10, multiple data output period numbers has been beforehand designated, by the server 1, for the terminal devices 200 and joy-pads 6 used in game program, and the server 1 latches data received using corresponding horizontal synchronizing signals, and then processes them. The above description is directed to a case where five players play a single game at the same time. The server 1 manages number of players. Maximum number of players (hereinafter referred to as "maximum player number") who can simultaneously join in the same game is different from game to game, and the maximum player number of each games are memorized in advance.

Figure 9:
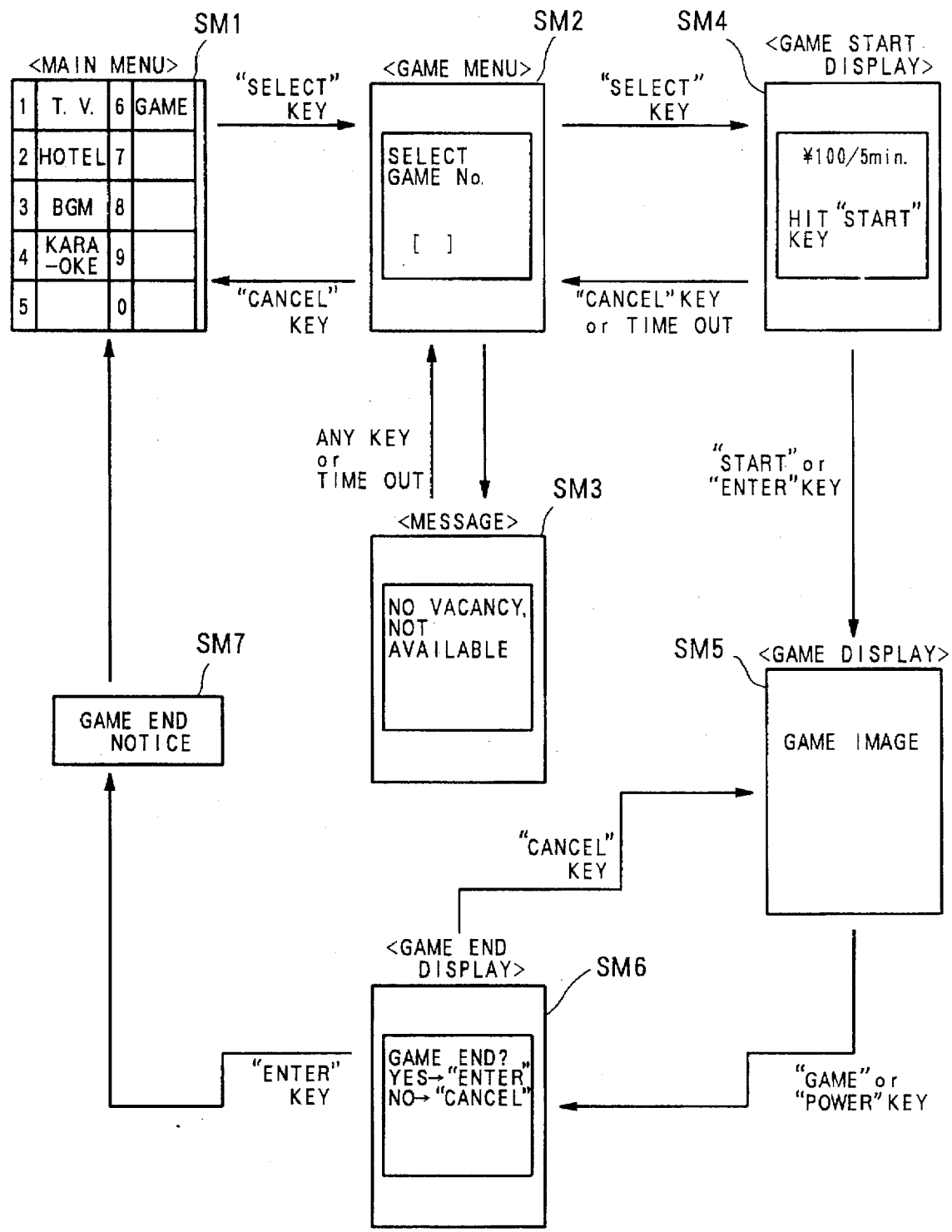
FIG. 9 is a diagram illustrating a transition of display information of the monitor according to operation of the system of the present invention.
Figure 10:
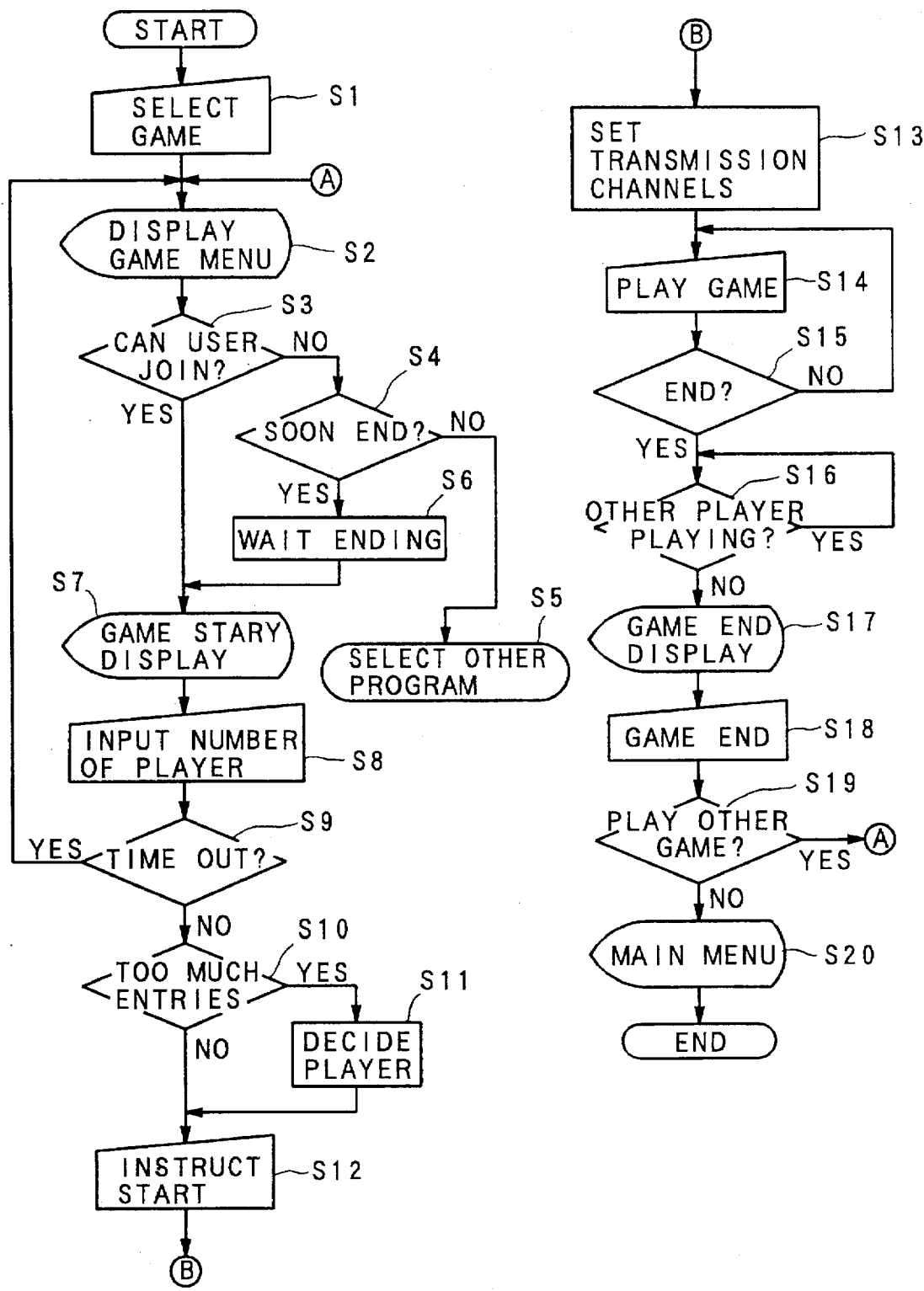
FIG. 10 is a flowchart illustrating an operation of the system of the present invention.

Next, an actual operation sequence Will be described with reference to FIGS. 9 and 10. The following description is based on the premise that a plurality of players play the game program of game equipment $3_{-1}$ from terminal device $200_{-1}$ provided in a room $R_1$. As an initial condition, the converting unit 4 is tuned to a specific channel for the menu display so that the service menu of the CCTV system is represented on the TV monitor 5 of the terminal device $200_{-1}$, and the system is waiting for user's instruction. The user selects a desired TV program or one of variety of programs presented by the CCTV system using the remote-controller RC or the tuning key $K_{-2}$ of the operation panel 35. This image information is stored in the ROMs 32 and 33. The CPU 20 receives code data designating a specific channel from the remote-controller RC or the operation panel 35 and sends received code data to the CRT controller 29. The CRT controller 29 reads out image data therefrom, and displays image thus read out. Then, one of users selects "GAME" from main menu (FIG. 9:SM1) using the remote-controller RC or the game selection key $K_{-3}$ of the operation panel 35 (FIG. 10: step S1). The CPU 20 outputs request data, and the modem 38 modulates it by FSK modulation. This request data is then transmitted from the converter 21 to the server 1 via the CCTV communication line 300. The server 1 receives request data, examines control information of multiple game equipments 3, and displays menu of games (FIG. 9:SM2) which user can play at that time (step S2). When the user selects a desired game from the game menu, the CPU 20 sends request data to the server 1 via the CCTV communication line 300 to discriminate whether the user can join in the game or not (step S3). If step S3 results in YES, game start display (FIG. 9:SM4), guiding the user to enter the game is represented on the monitor 5. Alternatively, if step S3 results in NO, the CPU 20 asks to the server 1 whether the game will end in a while or not. The server judges the playing condition of the game on the basis of control information. If the game will not end in a while (step S4:NO), the CPU 20 displays a message informing the user that the selected game is not available (FIG. 9:SM3), and display of the monitor 5 returns to the game menu (SM2) or the main menu (SM1) to enable the user to select an other program or game (step S5). If it is judged that the game will end in a while, the CPU 20 waits for the ending of the game (step S6), and when the server 1 gives a message informing the ending of the game to the terminal device $200_{-1}$, the CPU 20 makes the monitor 5 represent game start display (step S7). The game start display urges the user to input the number of people who wish to join in the game, and the user inputs the number of player, e.g., 2 (step S8). In a case where plural people play the game using the terminal device $200_{-1}$ together, the CPU 20 displays, in the game start display, information as to whether somebody is requesting to join in the same game from an other terminal devices $200_{-2}$ to $200_{-n}$, or not, for the sake of convenience. Then, the CPU 20 counts a time required for user's decision and operation to enter the game (step S9), and allows the monitor 5 to return to the game menu (FIG. 9:SM2) if the user's decision takes too much time (step S9:YES). This is because these games are service sources commonly owned and used by a plurality of people and, if the CPU 20 keeps on waiting for a user's instruction too long, other people who wishes to start playing the game are forced to wait for the start of the game for a long time. This gives a no good impression and no benefits to other users. Then, when the user completes the operation to enter the game (step S9:NO), the CPU 20 notifies the number of users who play the game to the server 1. If the number of people is larger than a maximum player number of the game (step S10:YES), the server 1 decides on the users who can play this time, arbitrarily and forcibly, (step S11), and sends information of users permitted to play, to the terminal device $200_{-1}$, as well as information of modulation channel and total number of players. Then, the CPU 20 makes preparation of joy-pads 6. Then, the terminal device $200_{-1}$ notifies each user of the start of the game by a message on the monitor 5, and one of the users instructs start of the game program (step S12). In response, the CPU 20 is informed of program transmission frequency from the server 1, reception frequency of the terminal device $200_{-1}$ and transmission frequency of program operation data from the modem 39, and sets channel of the converter 21 to the channel used for transmission of the game program from the game equipment 3 (step S13). When the game equipment 3 commences executing the game program, the terminal device $200_{-1}$ tunes the converter 21 to the channel by which information relating to the game is transmitted, the IF detector 26 demodulates and produces baseband video signal of the game image, and the game image is represented on the monitor 5 via the RF modulator 28. Users play the game using the joy-pads 6 with watching the game image thus displayed (step S14). If the user wishes to terminate playing the game, he instructs to represent game end display (FIG. 9:SM6) by the remote-controller RC or the operation panel 35 (step S15). If the user does not instruct termination of the game (step S15:NO), the game is continued. If the user instructs termination of the game (step S15: YES), the CPU 20 sends a termination command to the server 1. If the server 1 is still communicating with other terminal devices $200_{-2}$ to $200_{-n}$ in other rooms $R_2$ to $R_n$ (step S16:YES), the CPU 20 keeps waiting status. Alternatively, if all of the users in other rooms $R_2$ to $R_n$ have already ended the game (step S16:NO), the CPU 20 represents game end display (FIG. 9:SM6) on the monitor 5 (step S17). If the user selects another game after the game end display appeared (step S19:YES), the monitor 5 returns to the game menu (step S2). Alternatively, if the user instructs that he does not wish to play the game any more (step S19:NO), game end notice (FIG. 9:SM7) is displayed and then the display returns to the main menu (step S20).

As described above, according to the first embodiment, multiple games can be played simultaneously from multiple terminal devices via a communication line. In practice, assuming that a terminal device uses 10 bits and an 8-bits counter is used as the line counter 42, approximately 25 terminal devices (or rooms) can play a game simultaneously because NTSC video signal includes 262 horizontal lines in a single field. Since operation capability of a joy-pad by a human being (i.e., time period for pressing a button) does not becomes shorter than 150 ms and a single field of NTSC video signal is 16.7 ms (=1/60 sec.), program operation data can be sufficiently and correctly transmitted by the time divisional transmission described above. Further, even in a double-scanning type game program, data transmission is accurately performed by using similar horizontal/vertical sync-separator and timing signal distribution circuit.

2nd Embodiment:

Next, a second embodiment of the present invention will be described. In the second embodiment, construction of the system is identical to that of the first embodiment shown in FIGS. 2–5, and therefore detailed description thereof will be omitted. It is noted, however, that the system is so designed that the server 1 manages execution of game programs at the initiative of the center unit.

An operation will be described below. In the second embodiment in which the first embodiment is further improved, the center unit invites users using terminal device to join in a game program such as a battle-type game in which plural players can play together. Now, it is assumed that users who play a certain game equipment (e.g., game equipment $3_{-1}$) uses different terminal devices (e.g., terminal devices $200_{-1}$, $200_{-3}$ and $200_{-8}$) in different rooms, respectively (i.e., plural users play the game in respective rooms). Firstly, the server 1 sends command for offering users to join in a game program to unspecified terminal devices 200 at predetermined times (e.g., 0:00 pm, 1:00 pm . . .). Each of the terminal devices $200_{-1}$ to $200_{-n}$ receives the command and displays message to invite users to join in the game (e.g., displays message "Players Wanted" in the display SM2 in FIG. 9 for a given time period). Users who are operating the terminal devices $200_{-1}$ to $200_{-n}$ in the rooms $R_1$ to $R_n$ and wish to join in the game instruct the server 1 that they are going to enter the game, according to guide information displayed. Details of operation sequence is identical to that of the first embodiment. Entry of a user to the game is notified to the server 1, and the server 1 closes subscription if the number of the entries reaches a maximum player number. Subsequently, the server 1 transmits, to the terminal devices $200_{-1}$, $200_{-3}$ and $200_{-8}$ which join in the game, information including a message permitting users to join, distribution number of user (or joy-pad) who joins in the game, channel used for transmission of game video signal, and channel used for transmission of program operation data. Here, like the manner shown in FIG. 7, timing blocks of data output timing are allocated to respective terminal devices 200, and data output timings of respective joy-pads 6 are distributed to horizontal synchronizing periods for the number of players using the terminal device 200. This distribution information is also sent to the game equipment $3_{-1}$ which stores data of timings at which program operation data from respective joy-pads 6 are processed. Then, the reception modem 12 demodulates time-divided program operation data, and the multi-tap Tr supplies demodulated program operation data to the game body-unit 10 in response to the multi-tap timing signal $S_a$. In this embodiment, assuming that two players are in the room No. 1 and No. 3 and that one player is in the room No. 8, the timing generator 31 distributes numbers "01", "21" and "71" to the rooms, respectively. Then, program operation data of a first joy-pad 6 is allocated to 1st-H and 2nd-H from the rising edge of the vertical synchronizing signal, under the control of the server 1. Similarly, program operation data of second joy-pad 6 is allocated to 3rd-H and 4th-H and program operation data of third joy-pad 6 is allocated to 21th-H and 22th-H from the rising edge of the vertical synchronizing signal. This data is sent from respective terminal devices 200 to the switch SW via the modem 39 as time-sequential data. The switch SW turns ON only at the timings distributed to the respective joy-pads 6 to transmit the data to the reception modem 12. The reception modem 12 demodulates transmitted data into successive data to be received by the game body-unit 10.

According to the second embodiment, users in different rooms can play the same game together according to invitation from the center unit. Therefore, the system may function like an amusement system of the new-type in which many people can enjoy the same game together from respective rooms. In this embodiment, the user joining in the game may be only one or plural, and may be located in different rooms as described above.

3rd Embodiment:

Next, a third embodiment of the present invention will be described. In the third embodiment, construction of the system is identical to that of the first embodiment shown in FIGS. 2 to 5, and therefore detailed description thereof will be omitted. It is noted, however, that the operation mode of the server 1 is so designed that, during playing of the game by players using plural terminal devices, the server 1 permits a user to additionally join in the game currently played subject to a request for joining from the additional user. For example, while some users are playing the game of the game equipment $3_{-1}$ using the terminal devices $200_{-1}$ and $200_{-2}$, another user using another terminal device $200_{-3}$ can join in the game.

Next, an operation will be described below. This embodiment enables a user using a terminal device to join in a game, in the middle, being played by some players from other terminal devices by issuing request to join in the game. It is assumed that a single additional user who operates a terminal device $200_{-3}$ joins in the game currently played by the terminal devices $200_{-1}$ and $200_{-2}$ which are also operated by a single players, respectively. Firstly, the user using the terminal device $200_{-3}$ selects "GAME" from the menu display (FIG. 9:SM2) via a remote-controller or the like, and further inputs a number of a desired game. In response, data indicating the user's additional entry to the game is sent to the server 1, and the server 1 checks the playing condition of the game based on control information of the game equipment 3. If there remains no vacancy for an additional player in the selected game, the server 1 sends a command informing that the game is not available, and the terminal device $200_{-3}$ displays a message informing that on the monitor 5. Alternatively, if the game to be joined is not full, the server 1 sends permission of entry to the terminal device $200_{-3}$, and a game start display is represented on the monitor 5. Simultaneously, the server 1 refers to control information, and supplies information of channels for transmitting game video signal and program operation data to the terminal device $200_{-3}$. The terminal device $200_{-3}$ sets channels of the converter 21 and the modem 39. Further, the server 1 refers to distribution number of the terminal devices $200_{-1}$ and $200_{-2}$ which have been already used, finds out unoccupied (not used) distribution number and applies the number to the terminal device $200_{-3}$. The CPU 20 of terminal device $200_{-3}$ outputs, from its parallel port, this distribution number (e.g., "21") to the timing generator 31, and the decoder 43 in the timing generator 31 generates timing pulses at timings of 21th-H from vertical synchronizing signals. In the terminal device $200_{-3}$ which additionally joins in the game, the CPU 20 sets reception frequency of game program designated by the server 1 via the FSK receiver 37, frequency of the modem 39 and number of horizontal synchronizing periods distributed, and displays game image on the monitor 5. On the other hand, the server 1 sends commands, to the terminal devices $200_{-1}$ and $200_{-2}$, informing that a new player joins in the game, and it is displayed on the monitors 5 of the terminal devices $200_{-1}$ and $200_{-2}$, respectively. Then, the user of the terminal device $200_{-3}$ operates the joy-pad 6 with watching game image on the monitor 5. When program operation data of the terminal device $200_{-3}$ is supplied to the CPU 20, the CPU 20 controls the modem 39 and the switch SW to supply program operation data to the CCTV communication line 300 at the timings of timing pulses. The program operation data is transmitted at timings different from those of the terminal devices $200_{-1}$ and $200_{-2}$, and therefore data from the three terminal devices never conflict with each other.

According to the third embodiment, user can additionally join in a game by himself. In addition, if only one user uses a terminal device, it is unnecessary to distribute data output timings to multiple joy-pads for every terminal devices. Therefore, the server 1 can use successive distribution numbers (i.e., "1" for first terminal device, "2" for second terminal device, . . .). Further, the system is applicable to various programs to which multiple users can join (e.g., totalization program).

Other Modifications:

The present invention is not limited to the specific features described above and is applicable to various bidirectional communication systems. For example, the present invention is applicable to systems using commercial communication line such as CATV, regardless of what it is generally called. Although the number of the terminal units may be increased in that case, fundamental operation of the present invention can be applied in the similar manner as described above. In respect of television system, the present invention is applicable not only to NTSC system but also to any television systems such as PAL (Pulse Alternative by Line) and SECOM (Sequential-and Memory) systems, or interlaced and non-interlaced systems because they are only slightly different in signal specifications of the horizontal synchronizing period. In addition, if data transmission periods for a single player is one or two horizontal scanning periods, timing control is stably performed because group delay time of video signal transmitted by CCTV communication line does not exceed 1 µs in actuality.

As described above, according to the present invention, plural users can use a single program from multiple terminal devices in common. In addition, if plural people join in the same game, multiple data to be transmitted do not conflict with each other. Further, user can join in a program to play the game together with other users using different terminal units, and therefore new amusement system can be constructed with the aid of bidirectional communication system of this invention.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A bidirectional communication system comprising a center unit and one or more terminal units connected to the center unit via a communication line, said center unit comprising:

a program executing unit for executing one or more programs utilizing operation data in response to a selection signal specifying one of the programs to be executed and for transmitting information associated with the execution of the programs to the terminal units via the communication line;

a control unit for controlling the program executing unit and the terminal units, the control unit permitting the program executing unit to execute the programs specified by the selection signals utilizing the operation data transmitted from one or more terminal units;

a receiving unit for receiving the operation data from the terminal units and for supplying the operation data to the program executing unit, said operation data being necessary for execution of the programs specified by the selection signals; and an inviting unit for sending invitations to select the programs to be specified by the selection signals to all of the terminal units at every predetermined times, each of said terminal units comprising:

a transmitting unit for transmitting the selection signal to the center unit via the communication line; and an operation unit for generating the operation data in accordance with a user's instruction and for transmitting the operation data at data output timings designated to each terminal units by the control unit.

2. A system according to claim 1, wherein each of said terminal units comprises a display unit for displaying the associated information transmitted from the center unit.

3. A system according to claim 1, wherein said control unit decides channels for transmitting the associated information to the each of terminal unit so that the channels for each of the terminal units differ from each other.

4. A system according to claim 1, the associated information comprises a video signal of images relating to the program.

5. A system according to claim 4, wherein each of said operation units distributes the data output timings of each of the terminal units to synchronizing periods of the video signal.

6. A system according to claim 4, wherein each of said terminal units further comprises multiple manipulating devices for generating the operation data, respectively, and each of said operation units distributes data output timings of the manipulating devices to synchronizing periods of the video signal in time-division multiplexing manner.

7. A system according to claim 1, wherein said operation unit generates the operation data in response to a user's manipulation of a manipulating device.

8. A system according to claim 1, wherein each of said terminal devices comprises a instruction unit for receiving user's instruction to select program to be executed and producing the selection signal according to the user's instruction.

9. A system according to claim 1, wherein each of said center units further comprises one or more storage units for storing programs.

10. A system according to claim 1, wherein each of the operation units transmits the operation data in time-division multiplexed manner.

11. A system according to claim 1, wherein said communication line comprises a line installed in one of a CCTV system and CATV system.

12. A system according to claim 1, wherein said program comprises game program.

13. A system according to claim 1, wherein said program executing unit executes multiple programs in parallel, and the information associated with each programs are transmitted via different channels.

14. A system according to claim 1, wherein said program executing unit executes the specified program according to multiple operation data of plural users in a terminal unit, and operation data of the plural users are distinguished from each other according to time-division multiplexing.

* * * * *

UNITED STATES PATENT AND TRADEMARK OFFICE
CERTIFICATE OF CORRECTION

Figure 1:
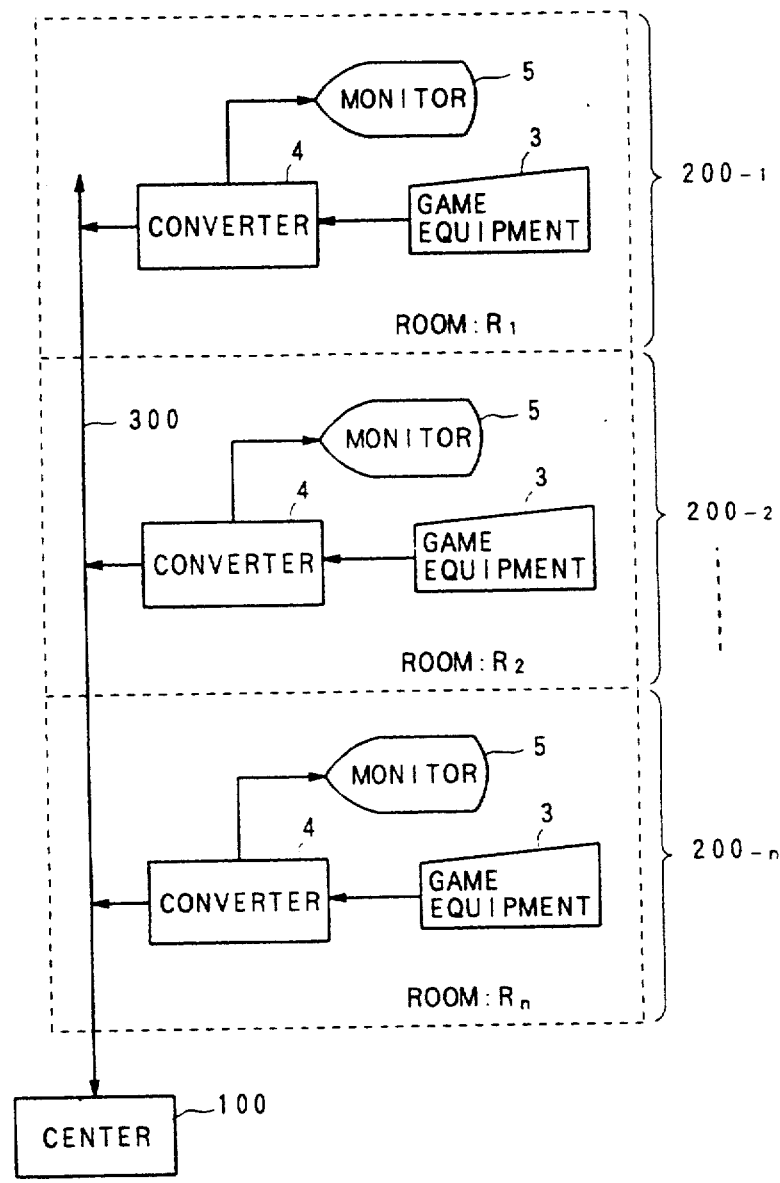
FIG. 1 is a block diagram illustrating an example of amusement system using game equipments with CCTV system.

PATENT NO. : 5,667,440
DATED : September 16, 1997
INVENTOR(S) : Masafumi Sasaki, et al It is certified that error appears in the above-indentified patent and that said Letters Patent is hereby corrected as shown below:

Delete Drawing Sheet 1 of 10, and substitute therefor the Drawing Sheet, consisting of Fig.1, as shown on the attached pages.

Signed and Sealed this

Seventh Day of July, 1998

Attest:

BRUCE LEHMAN

*Attesting Officer*  *Commissioner of Patents and Trademarks*